United States Patent
Vogt et al.

(10) Patent No.: US 8,192,798 B2
(45) Date of Patent: Jun. 5, 2012

(54) PROCESS FOR COATING EXTERIOR SURFACES OF PIPELINES WITH WATER CROSS-LINKABLE POLYMER

(75) Inventors: Heinz Vogt, Frankfurt am Main (DE); Peter Josef Gronsfeld, Tönsvorst (DE); Klaus Schmidt, Holzwickede (DE)

(73) Assignees: Basell Polyolefine GmbH, Wesseling (DE); Mulheim Pipecoatings GmbH, Mulheim a.d. Ruhr (DE)

( * ) Notice: Subject to any disclaimer, the term of this patent is extended or adjusted under 35 U.S.C. 154(b) by 1063 days.

(21) Appl. No.: 11/921,897

(22) PCT Filed: Jun. 9, 2006

(86) PCT No.: PCT/EP2006/063061
§ 371 (c)(1),
(2), (4) Date: Feb. 25, 2008

(87) PCT Pub. No.: WO2006/134077
PCT Pub. Date: Dec. 21, 2006

(65) Prior Publication Data
US 2009/0233029 A1    Sep. 17, 2009

(30) Foreign Application Priority Data
Jun. 14, 2005   (DE) .................. 10 2005 027 600

(51) Int. Cl.
*B05D 7/14*    (2006.01)
*F16L 58/10*   (2006.01)

(52) U.S. Cl. .............. 427/407.1; 427/409; 427/412.1; 427/412.3; 427/337

(58) Field of Classification Search .......... 427/407.1, 427/409, 412.1, 412.3, 337; 138/145, 146; 118/DIG. 11, DIG. 13
See application file for complete search history.

(56) References Cited

U.S. PATENT DOCUMENTS

| | | | | |
|---|---|---|---|---|
| 4,451,413 | A |   | 5/1984 | Stucke et al. ............... 264/26 |
| 4,990,383 | A | * | 2/1991 | Bergstrom et al. ......... 428/35.9 |
| 5,324,779 | A | * | 6/1994 | Jarrin et al. .................... 525/57 |
| 5,867,883 | A | * | 2/1999 | Iorio et al. ....................... 29/460 |
| 6,174,569 | B1 |  | 1/2001 | Blömer et al. ................ 427/410 |
| 7,087,697 | B2 |  | 8/2006 | Cornette et al. .............. 526/352 |
| 2006/0258796 | A1 | * | 11/2006 | Boogh et al. ................. 524/502 |

FOREIGN PATENT DOCUMENTS

| | | |
|---|---|---|
| AU | 654533 | 1/1992 |
| DE | 1965802 | 7/1971 |
| DE | 3047429 | 7/1982 |
| DE | 68925238 | 5/1996 |
| GB | 2170019 | 7/1986 |
| GB | 2181437 | 4/1987 |
| GB | 2410308 | 7/2005 |
| JP | 56-065667 | 6/1981 |
| RU | 2 073 612 | 2/1997 |
| RU | 2 203 913 | 5/2003 |
| WO | WO 94/22598 | 10/1994 |
| WO | WO 97/03130 | 1/1997 |
| WO | WO 2004/090032 A1 * | 10/2004 |

OTHER PUBLICATIONS

International preliminary examination report for PCT/EP2006/063061, Jan. 16, 2008, 8 pages.*
Genoni et al., "PEX/PE Coextruded Pipes for the Conveyance of Natural Gas," Plastics Pipes XII Conference (Actual publication date unknown).
Plastics Pipes XII Conference Programme (Apr. 19-22, 2004).
ELTEX®TUX100—The Cross-linkable Compound—Crosslinking Guide, Design Guide, Processing Guide (Solvay Polyolefins Europe Jun. 16, 2000).
flexALPEX, Excel PEX AI PEX System, print-out from http://flexalpex.com (Undated).
Argent et al., "Fitness for Purpose Issues Relating to FBE and Three Layer PE Coatings," NACE Corrosion 2005 (Actual publication date unknown).
Technical Papers on Corrosion Control by David Norman, print-out from http://davidnormancorrosioncontrol.com (Undated).
"Corrosion 2005" print-out from http://events.nace.org/conferences/c2005 (Undated).

* cited by examiner

*Primary Examiner* — William Phillip Fletcher, III
(74) *Attorney, Agent, or Firm* — James C. Lydon

(57) ABSTRACT

A process for coating the exterior surfaces of a pipeline with a polymer that is cross-linkable under exposure to water, including a) coating the exterior surface of the pipeline with at least one polymer that is cross-linkable under exposure to water, where the employed cross-linkable polymer includes alkoxy silane grafted HDPE; and b) cross-linking of the cross-linkable polymer by exposure to water at elevated temperatures so as to form a cross-linked polymer layer having a degree of cross-linking of from 30% to 80% is reached.

7 Claims, 3 Drawing Sheets

PROCESS FOR COATING EXTERIOR SURFACES OF PIPELINES WITH WATER CROSS-LINKABLE POLYMER

The invention concerns a coating and a process for the coating of exterior surfaces. More particularly, the invention concerns a process for coating the exterior surfaces of pipelines with a polymer that is cross-linkable under exposure to water.

Pipelines in the sense of the present invention relate to hollow bodies which are suitable for the transport of bodily media such as gases, liquids or solids.

Steel pipelines are used worldwide for the economical transport of petroleum and petroleum products, gas, water, vapour, solids and other media from the exploration or production site to the consumer. Steel pipelines must be protected against corrosion in order to guarantee the operating security of the pipelines over a long period of time. In order to achieve this, the pipelines are usually equipped with a corrosion protection during manufacturing. The most common coating techniques are:

1- or 2-layer-coating with FBE (fusion bonded epoxy);
3-layer-coating with epoxy, adhesive agent and a top layer made of non-cross-linked PE (polyethylene) or PP (polypropylene). This coating is also called MAPEC-coating.

A long-term corrosion protection is only given if the coating is not damaged during transport, installation and operation of the pipelines. In order to prevent damage to the FBE-coatings during transport and installation these must be handled with extreme caution. Despite the extensive precautions the need for repair is still great.

In order to prevent subsequent damage to the installed FBE as well as to the 3-layer-coated pipelines during operation these are usually embedded with a fine grind fill material, preferably sand or other mill material, in a pipeline trench. This is disadvantageous especially in that finely ground and therefore expensive fill material is mandatory in order to prevent damage to the pipelines. In particular cases the embedding has to be undertaken with sand.

The European patent application EP 619 343 A1 relates to an exterior coating for pipelines whose exterior layer comprises a silane cross-linked polymer composition made from polypropylene and co-polymers of propylene, ethylene and other monomers. In order to effect cross-linking this material is co-extruded with a peroxide and an unsaturated silane. In a further step the resulting material is co-extruded again with a cross-linking catalyst. In the end the material is then stored under water for several days in order to complete the cross-linking. A steel pipeline is then coated with the material resulting from this treatment.

This is disadvantageous in that for the manufacturing of the above-mentioned exterior coating additional complex and therefore costly process steps are needed. Not only does the silane cross-linked polyolefin have to be stored under water for several days, which binds capacities. Further production capacities are tied up because the pipelines have to be stored after applying the intermediate layers before the exterior layer of cross-linked polyolefin is applied.

The present invention has the object of overcoming at least one of the above-mentioned drawbacks in the state of the art. It is especially the object of the invention to provide a simplified process for coating pipelines with a polymer that is cross-linkable under exposure to water.

The object is achieved according to the present invention by a process for coating the exterior surfaces of pipelines with a polymer that is cross-linkable under exposure to water, comprising the steps:

a) coating the exterior surface of the pipeline with at least one polymer that is cross-linkable under exposure to water, wherein the employed cross-linkable polymer comprises alkoxy silane grafted HDPE;
b) cross-linking of the cross-linkable polymer by exposure to water at elevated temperatures under formation of a cross-linked polymer layer until a degree of cross-linking of $\geq 30\%$ to $\leq 80\%$ is reached.

The degree of cross-linking can, for example, be $\geq 40\%$ to $\leq 70\%$, preferably $\geq 45\%$ to $\leq 65\%$ and preferably about 50%. The degree of cross-linking can, for instance, be determined according to ISO 10147.

The employed polymer that is cross-linkable under exposure to water can comprise alkoxy silane grafted HDPE (high density polyethylene) in a range of $\geq 50$ weight-% to $\leq 100$ weight-% with respect to the total weight of the employed cross-linkable polymer. It is however also possible that the proportion of HDPE lies in a range of $\geq 70$ weight-% to $\leq 100$ weight-% or in a range of $\geq 98$ weight-% to $\leq 100$ weight-%.

HDPE in the sense of this invention denotes a polyethylene which has a density before cross-linking of $\geq 0.940$ g/cm$^3$ to $\leq 0.965$ g/cm$^3$, preferably $\geq 0.945$ g/cm$^3$ to $\leq 0.960$ g/cm$^3$, even more preferred $\geq 0.950$ g/cm$^3$ to $\leq 0.960$ g/cm$^3$, even more preferred $\geq 0.952$ g/cm$^3$ to $\leq 0.955$ g/cm$^3$ and/or a melt flow rate, expressed as MFR (190/2.16) of $\geq 0.3$ g/10 min to $\leq 10.0$ g/10 min, preferably $\geq 1.0$ g/10 min to $\leq 8.0$ g/10 min, even more preferred $\geq 3$ g/10 min to $\leq 6.6$ g/10 min, preferred mostly 3.5 g/10 min to 6.5 g/10 min.

The density of the HDPE can, for instance, be determined according to ISO 1183. The melt flow rate, expressed as MFR (190/2.16) can, for instance, be determined according to ISO 1133.

The HDPE can be produced in the presence of a catalytic system with a Ziegler-, Philips- or metallocene catalyst or combinations of these and a co-catalyst via a one-step or a multi-step reaction sequence of subsequent polymerisation steps and can therefore display a unimodal or multimodal molecular weight distribution.

The HDPE can comprise additives. These additives are preferably thermal and processing stabilizers, antioxidants, UV-absorbers, light protectors, metal deactivators, peroxide destroying compounds, organic peroxides, basic co-stabilizers in amounts of $\geq 0$ to $\leq 10$ weight-%, preferably $\geq 0$ to $\leq 5$ weight-%, but also soot, fillers, pigments or combinations of these in a total amount of $\geq 0$ to $\leq 30$ weight-% with respect to the total weight of the composition.

According to the present invention the alkoxy silanes that are grafted upon the polymer chain can, for example, be grafted onto the polymer chain by radical addition, cycloaddition, electrophilic addition or en reactions. Preferred as starting materials are alkenyl substituted alkoxy silanes such as vinyl silane esters selected from the group comprising vinyl trimethoxy silane, vinyl dimethoxy methyl silane, vinyl triethoxy silane, vinyl triacetoxy silane and/or vinyl tris (2-methoxy ethoxy) silane. It does not matter whether the grafting process takes place in a previous separate extrusion process or during the extrusion of the coating composition. In the latter step together with the silane to be grafted a Lewis acid as cross-linking accelerator selected from the group metal carboxylates comprising organic tin compounds, preferably dibutyl tin dilaurate, dioctyl tin dilaurate, dibutyl tin dicapronate, tin acetate and tin capronate can be incorporated.

According to the present invention the water cross-linkable polymer, preferably HDPE, may display a content of vinyl silane ester which has been grafted by reactive extrusion of $\leq 1$ weight-% to $\leq 5$ weight-%, preferably $\geq 1.4$ weight-% to $\leq 2.5$ weight-%, even more preferred 1.8 weight-%. The cross-linking of the silane grafted HDPE takes place by exposure to water at elevated temperatures. Without being bound to a certain theory, it is assumed that first the alkoxy silanes are partially or completely hydrolyzed to the corresponding silanols under the liberation of alcohols. In a further step the silanol centers condense under the formation of siloxane bridges and the liberation of water. "Elevated temperatures" in the sense of the present invention means a temperature above room temperature. For example the temperature may be $\geq 50°$ C. to $\leq 350°$ C., preferably $\geq 150°$ C. to $\leq 300°$ C., even more preferred $\geq 200°$ C. to $\leq 260°$ C.

The degree of cross-linking according to the present invention allows for a greatly improved resilience of the polymer layer. For example the degree of cross-linking in the polymer layer manufactured according to the present invention leads to an improved impact resistance and notch impact resistance. This is advantageous when the coated object is subjected to an environment with high mechanical stress such as installing the pipeline in rocky soil or strong temperature variations.

For the cross-linking in the process according to the present invention water is let to act upon the cross-linkable polymer layer until a degree of cross-linking of $\geq 30\%$ to $\leq 80\%$ is reached. However it is also possible to reach a lower or higher degree of cross-linking by a shorter or longer period of time for the reaction of water. For example the degree of cross-linking can be $\geq 25\%$ to $\leq 80\%$ or $\geq 20\%$ to $\leq 80\%$. Degrees of cross-linking below 20% do not lead to advantageous material properties and introduce the need for post-processing the coated product. Degrees of cross-linking of above 80% are difficult to achieve by the acting upon of water alone. Here the concentration of silane centres in the polymer chain plays a role because not every free silane centre has a further silane centre within reach with which it can cross-link. Furthermore, such cross-linked coatings display substantially inferior mechanical properties.

The degree of cross-linking may be determined with methods known to any person skilled in the art such as IR- (infrared) or NMR- (nuclear magnetic resonance) spectroscopy. In the present invention it is preferably determined by the determination of the gel content according to the norm ISO 10147.

The pipelines according to the present invention may be selected from the group comprising metal pipelines, steel pipelines and/or plastic pipelines. Steel pipelines which are coated according to the present invention are well suited for transporting petroleum and petroleum products, gas, vapour, water, solids and other media from the exploration or production site to the consumer.

It is an advantage of the present invention that the cross-linking of the water cross-linkable polymer can be undertaken directly after the coating of the cross-linkable layer onto the pipeline that is to be coated and within one process step during the coating of the pipeline.

It has been surprisingly found in the process according to the present invention that an inline-cross-linking is possible if the process steps—cooling of the coating and the pipeline—are specially coordinated and if they are in succession of each other.

Therefore the process according to the present invention allows for an economically attractive large-scale application of cross-linkable polymer as an exterior functional layer in a multi-layered corrosion protection coating of pipelines.

According to the present invention it can be preferred that the pipeline according to the invention is provided with at least two different exterior coatings, preferably with at least three different exterior coatings, especially preferred with at least four different exterior coatings.

The layer of cross-linked polymer according to the present invention, especially silane cross-linked HDPE, is advantageously designated as the most exterior top pipeline coating. The additionally applied layers can be selected from the group comprising epoxy resin primer, adhesive agent and/or HDPE.

For example as a first layer a coating based on epoxy resin, as a second layer a coating based on adhesive agent and above that a layer based on HDPE may be applied to the pipeline. As the outmost exterior layer a polymer layer according to the present invention, preferably silane cross-linked HDPE, is applied onto the previously mentioned layers.

The use of an epoxy resin as first layer on the pipeline is advantageous because the materials of the pipeline and of the further layers to be applied can be incompatible to each other. Therefore the epoxy resin provides for a good priming and adhesion of the further layers. It is furthermore advantageous that epoxy resins can be applied uniformly with a powder spray process. This process is solvent-free and therefore attractive from an environmental protection and a financial standpoint. The thickness of the applied layer can be influenced so that the complete coating of the pipeline with at the same time the least possible use of epoxy resin is possible. For example the epoxy resin can be applied with layer thicknesses of $\geq 0.08$ mm to $\leq 0.16$ mm, preferably $\geq 0.10$ mm to $\leq 0.13$ mm, even more preferred 0.125 mm.

The next step in the coating can be the application of a polymeric adhesive agent. These adhesive agents have the task of providing a durable and strong connection between the primer (and therefore the substrate) and a further outer layer. The thickness of the adhesive agent layer is preferably selected so that a uniform application without tearing of the adhesive agent layer on the one side and a good performance of the adhesive agent on the other side is achieved. Too thin layers bear the danger the adhesive agent does not completely cover the substrate due to separation during the application. In layers that are too thick the properties of the adhesive agent are not governed any more by the adhesion at the respective substrate borders but by the cohesion forces within the adhesive agent. Then the adhesive properties would deteriorate. For example, one can apply the adhesive agent with layer thickness of $\geq 0.15$ mm to $\leq 0.30$ mm, preferably $\geq 0.22$ mm to $\leq 0.27$ mm, even more preferred 0.25 mm.

Next an HDPE top layer can be applied. Such layers can, when the thickness is chosen accordingly, act as a barrier against temperature variation, electric currents, and leakages of the pipeline. To achieve this goal an HDPE top layer with a layer thickness of $\geq 2.8$ mm to $\leq 3.2$ mm, preferably $\geq 2.9$ mm to $\leq 3.1$ mm, even more preferred 3 mm can be applied.

The outmost exterior layer can then be a cross-linkable polymer layer according to the present invention, for example a silane cross-linkable HDPE layer. As already mentioned, a higher impact resistance and notch impact resistance is achieved in the coating so that pipelines coated according to the present invention can be used in environments with high mechanical stress. The thickness of the silane cross-linkable HDPE layer is governed by the demands of the economic use of the material and the functionality, for example in order to achieve a satisfying resistance against sharp-edged embedding material for the pipelines. For example the silane cross-linkable HDPE layer can be applied with a layer thickness of $\geq 0.8$ mm to $\leq 1.2$ mm, preferably $\geq 0.9$ mm to $\leq 1.1$ mm, even more preferred 1 mm.

The application of the silane cross-linkable HDPE layer can be undertaken with the usual coating techniques used for pipelines, such as wrapper-extrusion or tube-extrusion (cross head). The application of the cross-linkable exterior layer can be undertaken either in co-extrusion with one nozzle together with a standard polymer that is usually used as an exterior layer for pipeline coatings or as a separately extruded and applied coating material onto the immediately beforehand extruded and applied polymer top layer. Directly after the application of the polymer that is cross-linkable under exposure to water the coated pipeline and therefore also cross-linkable polymer layer is sprayed with water.

Due to its cross-linking the silane cross-linked polymer layer contributes advantageously to the properties of the pipeline. In a further embodiment of the present invention the silicon content of the cross-linked polymer layer is from $\geq 0.10$ weight-% to $\leq 1.00$ weight-%, preferably $\geq 0.30$ weight-% to $\leq 0.40$ weight-%, more preferred $\geq 0.33$ weight-% to $\leq 0.35$ weight-%. At these silicon contents the desired properties such as elongation, breaking elongation, impact resistance or notch impact resistance are achieved without bearing too much silicon containing material. The determination of the silicon contents can be done with methods known to any person skilled in the art such as elemental analysis or atom absorption spectroscopy.

In order to improve the cross-linking it can be envisioned that the water flows over the pipeline in a laminar current. By avoiding a turbulent current several advantages are gained. Firstly it is ensured that the water flows over the entire surface and that no areas of the pipeline surface remain where due to turbulences or flow ablation water has not sufficiently flown over. In this context it is also achieved that the coated pipeline cools down uniformly and that the water cross-linkable polymer layer cross-links uniformly.

In a further embodiment of the present invention the time for the step of the reaction with water for the cross-linking of the polymer layer is from $\geq 0.5$ min to $\leq 5.0$ min, preferably $\geq 1.0$ min to $\leq 3.0$ min, more preferred $\geq 1.9$ min to $\leq 2.1$ min per meter of the pipeline moving in longitudinal direction. For example an 8 m long pipeline would be treated with water for a period of about 16 min. This duration ensures that the desired degree of cross-linking is achieved without unnecessarily binding production capacity.

In a further preferred embodiment of the present invention the cross-linking of the polymer that is cross-linkable under exposure to water takes place at a temperature of $\geq 50°$ C. to $\leq 350°$ C., preferably $\geq 150°$ C. to $\geq 300°$ C., even more preferred $\geq 220°$ C. to $\leq 260°$ C. These temperatures denote the temperature of the cross-linkable polymer layer before the treatment with water. At lesser temperatures the cross-linking reaction does not run fast enough and the evaporation of the alcohols formed by silane hydrolysis is not complete. On the other hand the applied cross-linkable polymer layer is not stable enough at higher temperatures and has a too low viscosity for a uniform coating.

In another further preferred embodiment of the present invention the process according to the invention comprises the following steps:
heating the pipeline to $\geq 170°$ C. to $\leq 230°$ C., preferably $\geq 180°$ C. to $\leq 220°$ C., even more preferred $\geq 190°$ C. to $\leq 210°$ C.;
application of an epoxy resin by an electrostatic powder spray process with a layer thickness of $\geq 0.08$ mm to $\leq 0.16$ mm, preferably $\geq 0.10$ mm to $\leq 0.13$ mm, even more preferred 0.125 mm;
application of an adhesive agent by a wrapper extrusion process with a layer thickness of $\geq 0.15$ mm to $\leq 0.30$ mm, preferably $\geq 0.22$ mm to $\leq 0.27$ mm, even more preferred 0.25 mm;
application of an HDPE top layer by extrusion with a layer thickness of $\geq 2.8$ mm to $\leq 3.2$ mm, preferably $\geq 2.9$ mm to $\leq 3.1$ mm, even more preferred 3 mm;
application of a silane cross-linkable HDPE layer by extrusion with a layer thickness of $\geq 0.8$ mm to $\leq 1.2$ mm, preferably $\geq 0.9$ mm to $\leq 1.1$ mm, even more preferred 1 mm;
treating of the pipeline with water, wherein the water preferably has a temperature of $\geq 10°$ C. to $\leq 40°$ C., preferably $\geq 20°$ C. to $\leq 30°$ C., even more preferred 25° C.

The extrusion temperature during the application of the adhesive agent is important because at elevated temperatures a faster bonding to the primer layer is guaranteed. Therefore it is possible to avoid standstill of machinery during the production process. The maximum temperature is limited by the thermal stability and the viscosity of the adhesive agent. In a further preferred embodiment of the present invention the extrusion temperature during the application of the adhesive agent therefore is from $\geq 200°$ C. to $\leq 250°$ C., preferably $\geq 210°$ C. to $\leq 240°$ C., even more preferred $\geq 220°$ C. to $\leq 230°$ C.

In the same way the extrusion temperature during the application of the HDPE top layer is important because at elevated temperatures a faster bonding to the adhesive agent layer is ensured. Therefore it is also possible to avoid standstill during the production process. The maximum temperature is limited by the thermal stability and the viscosity of the HDPE top layer. In a further preferred embodiment of the present invention the extrusion temperature during application of the HDPE top layer therefore is from $\geq 220°$ C. to $\leq 240°$ C., preferably $\geq 225°$ C. to $\leq 235°$ C., even more preferred 230° C.

An advantage of the process according to the invention is that pipelines can be coated within a short period of time. For example the line speed of the steel pipeline during the coating can be from $\geq 0.5$ m/min to $\leq 4$ m/min, preferably $\geq 1$ m/min to $\leq 3$ m/min, even more preferred 2 m/min.

A high temperature of the pipeline before beginning of the water cooling is advantageous for several reasons. Firstly a high pipeline temperature ensures a good fusing of the PE top layer and the silane cross-linkable HDPE layer. By this a durable bonding is effected and gaps or holes in the coating are avoided. Furthermore a high temperature is beneficial for a high reaction speed of the subsequent cross-linking step. In a further preferred embodiment of the present invention the temperature of the pipeline before beginning of the water cooling is therefore from $\geq 170°$ C. to $\leq 210°$ C., preferably $\geq 180°$ C. to $\leq 200°$ C., even more preferred 190° C.

For the above-mentioned reasons, however even more directly a high temperature of the surface of the coating before the water cooling and therefore the cross-linking step is important. In a further preferred embodiment of the present invention the surface temperature of the coating before the beginning of the water cooling is from $\geq 220°$ C. to $\leq 260°$ C., preferably $\geq 230°$ C. to $\leq 250°$ C., even more preferred 240° C.

After the spraying with water the cross-linking still proceeds further to a certain degree. In order to let the reaction run as far as possible an elevated temperature of the surface of the coating is beneficial. In a further preferred embodiment of the present invention the surface temperature of the coating after the water cooling is from $\geq 40°$ C. to $\leq 80°$ C., preferably $\geq 50°$ C. to $\leq 70°$ C., even more preferred 60° C.

As well as that an elevated temperature of the pipeline itself after the contact with water is advantageous for the proceeding of the cross-linking reaction because the pipeline keeps the material in the depth of the layer that is to be cross-linked at an advantageous temperature. In a further preferred embodiment of the present invention therefore the temperature of the pipeline after the water cooling is from ≧40° C. to ≦100° C., preferably ≧50° C. to ≦90° C., even more preferred ≧60° C. to ≦80° C.

The remainder time of the entire pipeline in the cooling step is decisive for the extent of the cross-linking reaction by the continuous spraying with water. Furthermore, the pipeline can be handled safely after cooling because no temperatures that would be dangerous for personnel or machinery are present. In a further preferred embodiment of the present invention therefore the remaining time of the pipeline in the cooling step is from ≧14 min to ≦18 min, preferably ≧15 min to ≦17 min, even more preferred 16 min.

For pipelines with a lower diameter it can be advantageous to undertake the coating by a tube extrusion, that is by a ring nozzle. With this a non-cross-linkable and a cross-linkable polymer layer may be co-extruded. For larger pipelines an alternative would be the coating by wrapping extrusion.

A substantial advantage of pipelines coated according to the present invention is the durability against mechanical damages even during extremely adverse conditions. The breaking elongation as well as the behaviour in the ESCR-test give information about how a coating will endure over a longer period of time under adverse transport and installation conditions or environmental conditions like coldness, UV radiation, chemically contaminated soils or micro-organisms.

The silane cross-linked polymer layer contributes advantageously to the properties of the coating and therefore to the possibilities of use for the pipeline. In a preferred embodiment of the present invention the breaking elongation of the coating, measured at −45° C., is from ≧135% to ≦400%, preferably ≧200% to ≦300%, even more preferred ≧240% to ≦260%. By this the use of the pipelines in cold environments, for example in a permafrost soil, is possible.

Another advantageous property of the coating to which the silane cross-linked polymer layer contributes is its stress crack resistance. In another advantageous embodiment of the preferred invention the coating remains stable in the environmental stress crack resistance (ESCR) test (FNCT at 4.0 MPa, 80° C.) over a time period of ≧100 hours to ≦10000 hours, preferably ≧500 hours to ≦2000 hours and more preferred ≧900 hours to ≦1100 hours. This makes use in environments with sharp edges possible. Furthermore, the sensitivity of the coated pipeline during transport is decreased.

According to an advantageous embodiment of the present invention the exterior surface of the pipeline is coated with at least two different layers, preferably with at least three layers, and more preferred with at least four different layers.

As its outermost layer the pipeline preferably comprises the coating of cross-linked polymer, especially silane cross-linked HDPE, which can be manufactured according to the present invention.

The additional layers can be selected from the group comprising epoxy resin, adhesive agent and/or HDPE. Preferably the first interior exterior coating of the pipeline comprises the first layer based upon epoxy resin. On top of this first layer a second exterior coating can be applied, which bases upon an adhesive agent. On the first layer or the second layer a further third exterior layer based upon HDPE can be applied, wherein a layer of silane cross-linked HDPE is present as most exterior top layer.

The invention further provides a pipeline which comprises at least one exterior surface coating based upon a first cross-linkable polymer, wherein the first cross-linkable polymer comprises silane cross-linked HDPE and the cross-linked polymer has a degree of cross-linking of ≧30% to ≦80%.

With the degree of cross-linking according to the present invention the durability of the exterior surface coating can be improved remarkably. For example this degree of cross-linking leads to an improved impact resistance and notch impact resistance, making it possible to use the pipeline in environments with high mechanical stress.

The pipeline according to the invention can comprise a multi-layered surface coating, wherein a first lower layer is an epoxy layer, a second middle layer is an adhesive agent layer, a third top layer is an HDPE layer with a bimodal molecular weight distribution and a fourth exterior layer being the silane cross-linked HDPE layer. With this structure the demands upon the pipeline during transport, installation and operation under adverse environmental conditions can be met advantageously.

The silane cross-linked polymer layer of the pipeline contributes, amongst others by its cross-linking, advantageously to the properties of the pipeline. In a preferred embodiment of the present invention, the silane cross-linked HDPE layer has a silicon content of ≧0.10 weight-% to ≦1.00 weight-%, preferably ≧0.30 weight-% to ≦0.40 weight-%, more preferred ≧0.33 weight-% to ≦0.35 weight-%. At these contents of silicon the desired properties like elongation, breaking elongation, impact resistance or notch impact resistance are achieved without carrying too much silicon-containing material. The determination of the silicon content can be done with methods known to a person skilled in the art like elemental analysis or atomic absorption spectroscopy.

As already discussed, the silane cross-linked polymer layer contributes advantageously to the properties of the coating and therefore to the use of the pipeline. In a further preferred embodiment of the present invention the silane cross-linked HDPE layer has a breaking elongation at −45° C. of ≧135% to ≦400%, preferably ≧200% to ≦300%, even more preferred ≧240% to ≦260%. With this the use of the pipeline, for example, in a permafrost soil is possible.

In a further preferred embodiment of the present invention the silane cross-linked HDPE layer remains stable in the environmental stress crack resistance (ESCR) test (FNCT at 4.0 MPa, 80° C.) over a time period of ≧100 hours to ≦10.000 hours, preferably ≧500 hours to ≦2000 hours, and more preferred ≧900 hours to ≦1100 hours. Therefore the pipeline is resistant to adverse environmental conditions.

The invention furthermore provides a coating which is producible according to the present invention. For example the coating can comprise the following composition:

epoxy resin with a layer thickness of ≧0.08 mm to ≦0.16 mm, preferably ≧0.10 mm to ≦0.13 mm, more preferred 0.125 mm;

adhesive agent with a layer thickness of ≧0.15 mm to ≦0.30 mm, preferably ≧0.22 mm to ≦0.27 mm, more preferred 0.25 mm;

HDPE top layer with a layer thickness of ≧2.8 mm to ≦3.2 mm, preferably ≧2.9 mm to ≦3.1 mm, more preferred 3 mm;

silane cross-linkable HDPE layer with a layer thickness of ≧0.8 mm to ≦1.2 mm, preferably ≧0.9 mm to ≦1.1 mm, more preferred 1 mm.

An advantage of the silane cross-linked coating is its low thermal elongation. In a further preferred embodiment of the present invention the thermal elongation (hot set) of the cross-linked polymer layer at 200° C., 15 min, is ≧70% to ≦90%, preferably ≧80% to ≦85%, even more preferred 83%. By this the coating deforms, softens or flows less, even under the weight of the pipeline, when the pipeline transports hot media or is subjected to great heat.

A further advantageous property of the silane cross-linked coating is its resistance against leaching by non polar solvents. Enough cross-linked material remains after leaching by such solvents in order to guarantee functional stability. In a further preferred embodiment of the present invention therefore the gel content of the cross-linked polymer layer is from $\geq 50\%$ to $\leq 70\%$, preferably $\geq 60\%$ to $\leq 65\%$, even more preferred 64%. Therefore the danger of a malfunction of the coating is lessened when contacted by solvents like gasoline.

It is also an advantage of the coating according to the present invention that it swells as little as possible when contacted with non polar solvents because a softening of the coating would then take place. In a further preferred embodiment of the present invention the swelling value (xylene) of the cross-linked polymer layer is from $\geq 5\%$ to $\leq 10\%$, preferably $\geq 9\%$ to $\leq 10\%$, more preferred 9.2%. Therefore the danger of a malfunction of the coating is also decreased when contacted by solvents like gasoline.

Furthermore, the silane cross-linked layer contributes advantageously to the stability against environmental influences. In a further preferred embodiment of the present invention the ESCR (environmental stress crack resistance) value ($F_0$-value) of the cross-linked polymer layer shows no breaking after a time of greater than 6000 hours. In another preferred embodiment of the present invention the cross-linked polymer layer shows no failure in the ESCR (environmental stress crack resistance)-test (FNCT at 4.0 MPa, 80° C.) after a time of greater than 1000 hours. The high stress crack resistance allows for use of the coating for pipelines in areas with high solar radiation like desert areas.

A further advantage of the silane cross-linked coating is that it shows a low tendency to creep, that is that it elongates as little as possible under tension. In a further preferred embodiment of the present invention the elongation of the cross-linked polymer layer in the time stand-elongation experiment at 23° C./96 hours, measured at the top layer, is from $\geq 0.3\%$ to $\leq 0.9\%$, preferably $\geq 0.5\%$ to $\leq 0.7\%$, even more preferred 0.6%. If such a coating is mounted upon a support, a creeping of the coating and therefore a weakening is not to be feared.

Further advantages of silane cross-linked coating are listed below. In a further preferred embodiment of the present invention the impact resistance of the cross-linked polymer layer shows no break at −100° C. In a further preferred embodiment of the present invention the notch impact resistance of the cross-linked polymer layer shows no break at −40° C. These impact resistances and notch impact resistances allow to transport the coating according to the present invention with less problems because fewer measures of caution have to be taken. Furthermore, such coatings last longer in regions that are prone to rock fall because they are damaged less.

In a further preferred embodiment of the present invention, the tear strength of the cross-linked polymer layer at 23° C. is from $\geq 15$ MPa to $\leq 20$ MPa, preferably $\geq 16$ MPa to $\leq 17$ MPa, even more preferred 16.5 MPa. A high tear strength is, for example, advantageous when the silane cross-linked layer is subjected to sudden shear stress, found for example with strong wind forces acting upon the pipeline coated with the coating according to the present invention and which is not installed in the ground.

In a further preferred embodiment of the present invention the breaking elongation of the cross-linked polymer layer at −45° C. is $\geq 230\%$ to $\leq 270\%$, preferably $\geq 240\%$ to $\leq 260\%$, more preferred 250%. A high breaking elongation at such a low temperature is advantageous, for example when the silane cross-linked layer is installed in a permafrost soil and where it has to be prevented that the layer becomes brittle.

The present invention is further elucidated in FIG. 1 to 3.

Figure 1:
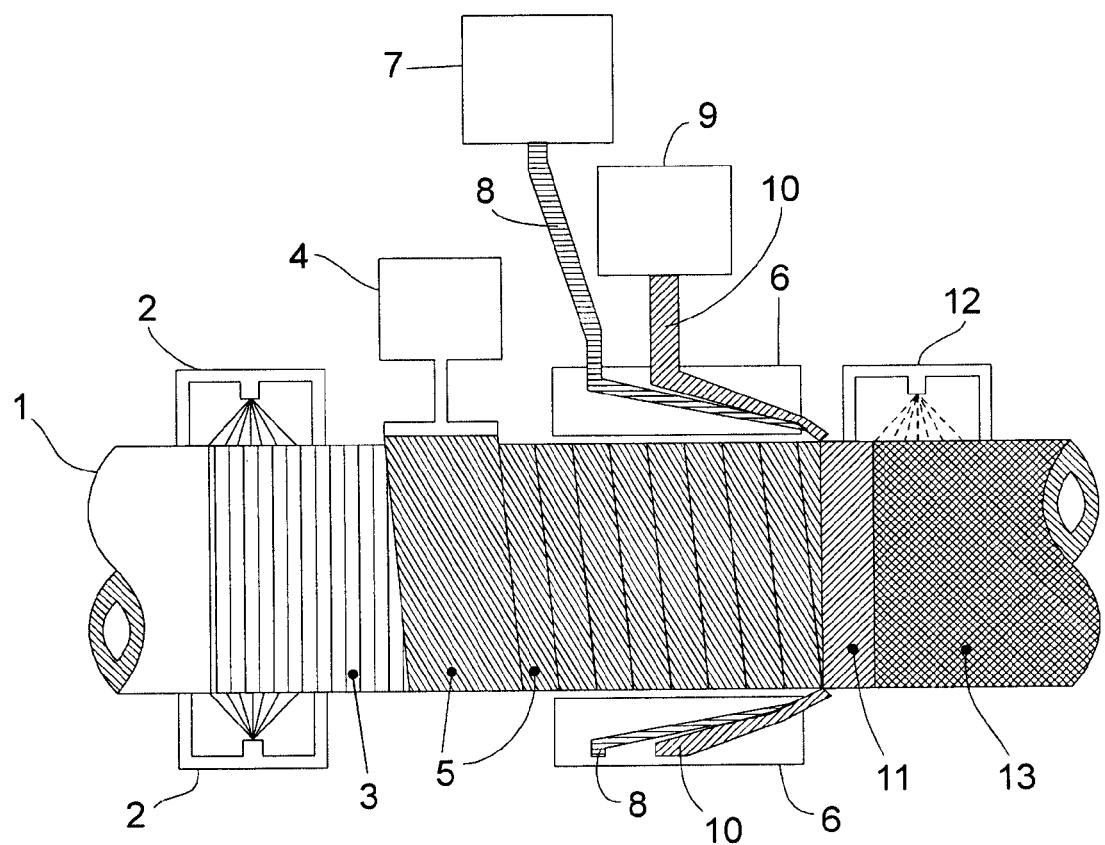
FIG. 1 shows a process according to the present invention for the coating of objects.

FIG. 1 shows a previously blasted and heated pipeline (1) which in a first step is covered with a priming layer of epoxy resin (3) in an electrostatic powder spray system (2). Next a layer of a standard adhesive agent (5) is applied with the help of a wrapping extruder (4). Further on in the direction of the movement of the pipeline, material streams through a ring nozzle (6) from a further extruder (7) which transports polyethylene (8) and from another extruder (9) which transports a silane cross-linkable polyethylene (10). These two material streams are co-extruded onto the pipeline (11). As last step a spray system (12) effects the spraying of the outermost polymer layer with water in order to cross-link the cross-linkable polymer under formation of the silane cross-linked layer (13).

Figure 2:
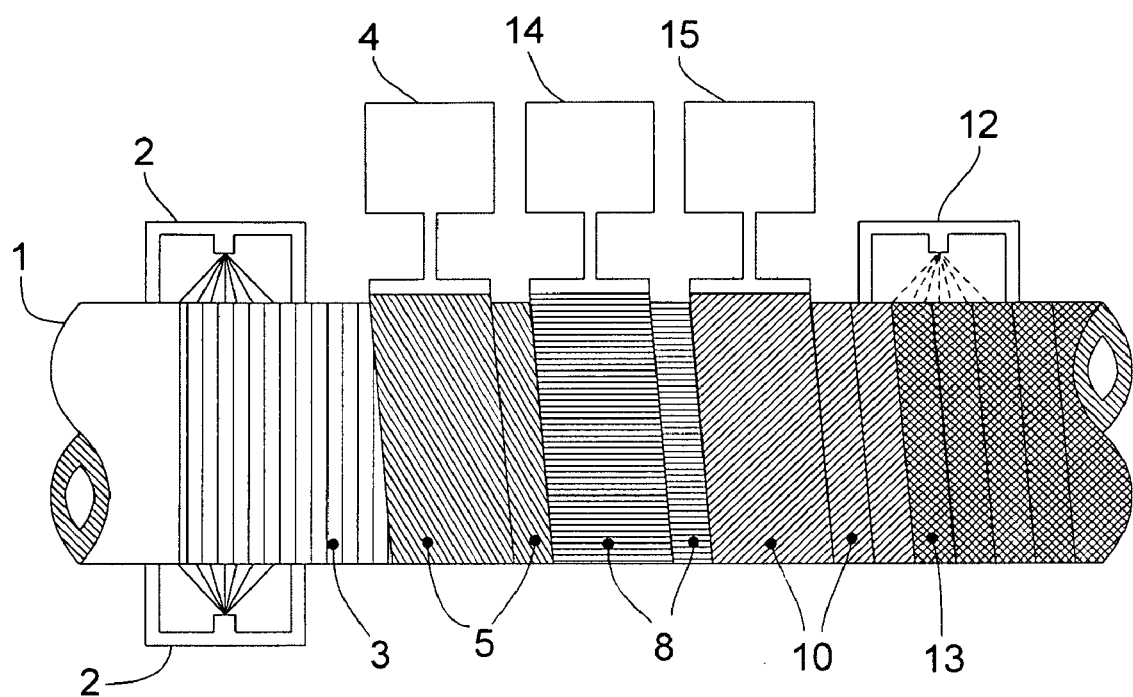
FIG. 2 shows a further process according to the present invention for the coating of objects.

FIG. 2 shows a previously blasted and heated pipeline (11) which in a first step is coated with a primer layer of epoxy resin (3) in an electrostatic powder spray system (2). In the next step a layer of standard adhesive agent (5) is applied with the help of a wrapping extruder (4). Further on in the direction of the movement of the pipeline a further wrapping extruder (14) applies a polyethylene layer (8). With a further wrapping extruder (15) a layer of silane cross-linkable polyethylene (10) is applied. The last step is the spraying of the topmost polymer layer with water in a spraying system (12) in order to cross-link the cross-linkable polymer under formation of the silane cross-linked layer (13).

By this it is possible that the coated pipelines display a degree of cross-linking of over 50% already after leaving the cooling station so that a further, additional, cross-linking is not needed anymore.

Figure 3:
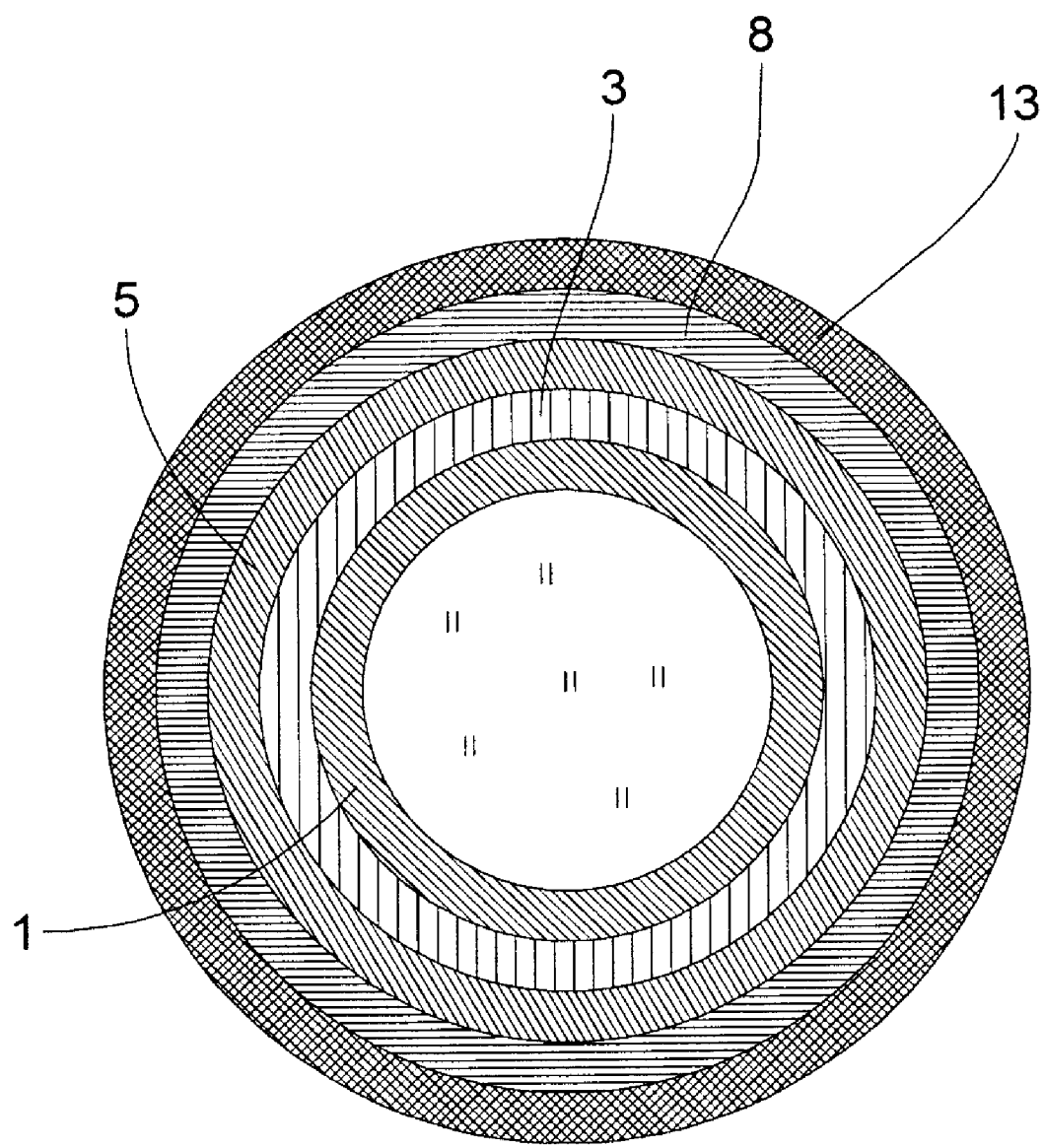
FIG. 3 shows a cross-section through a pipeline coated according to the present invention.

FIG. 3 shows a cross-sectional view through a pipeline coated according to the present invention. On a previously blasted and heated pipeline (1) there is at first a primer layer of epoxy resin (3). Above this layer is a layer of a standard adhesive agent (5). Above that is a polyethylene layer (8). As outermost exterior layer a silane cross-linked layer (13) is applied.

The process according to the present invention will be elucidated further with the help of example 1 and the comparative example.

EXAMPLE 1

A blasted steel pipeline (diameter 48 inches) was heated 200° C. Onto this steel pipeline the following layers were applied one after each other:

As a first layer a standard epoxy resin was applied by an electrostatic powder spray process with a thickness of about 0.12 mm, directly onto this layer a standard adhesive agent was applied by a wrapping extrusion process, the thickness thereof being about 0.25 mm, onto this layer then a standard HDPE top layer material with a thickness of about 3 mm was extruded, with a second nozzle that is placed directly thereafter the application of the silane cross-linkable last layer according to the present invention takes place in a thickness of about 1 mm onto the previously applied still molten PE top layer material.

This process ensures a good bonding of the PEX layer to the previously applied thermoplastic PE layer. Because the PEX layer is not yet cross-linked at the time of the application a good bonding in the region of overlap of the applied foils in the wrapper extrusion process is given. The process parameters as well as the properties of the accordingly coated pipelines are summarized in the tables 1 and 2.

COMPARATIVE EXAMPLE

In analogy to the process as described in example 1 pipelines were coated under identical process parameters, however without the PEX layer. In contrast to the experiment with the PEX layer the hereby coated pipelines had to be cooled down more rapidly in order to avoid damage to the thermal plastic PE layer in the cooling area. The process parameters as well as the properties of the accordingly coated pipelines are summarized in the tables 1 and 2.

TABLE 1

| | | process parameters | |
|---|---|---|---|
| | Unit | Example | Comparative Example |
| Temperature of the pipeline | °C. | 190 to 210 | 190 to 210 |
| Epoxy | | Fusion Bonded Epoxy | Fusion Bonded Epoxy |
| Thickness of the epoxy layer | mm | 0.125 | 0.125 |
| Adhesive agent | | HDPE copolymer with polar groups and a density of 0.931 g/cm$^3$, a melt flow rate of 3 g/10 min (190° C./2.16 kg) and a tensile modulus von 74 MPa (23° C.) | HDPE copolymer with polar groups and a density of 0.931 g/cm$^3$, a melt flow rate of 3 g/10 min (190° C./2.16 kg) and a tensile modulus von 74 MPa (23° C.) |
| Thickness of the adhesive agent layer | mm | 0.25 | 0.25 |
| Extrusion temperature of the adhesive agent | °C. | 220 to 230 | 220 to 230 |
| PE top layer | | Bimodal HDPE with a density of 0.956 g/cm$^3$, a melt flow rate of 0.3 g/10 min (190° C./2.16 kg) and a tensile modulus of 900 MPa (23° C.) | Bimodal HDPE with a density of 0.956 g/cm$^3$, a melt flow rate of 0.3 g/10 min (190° C./2.16 kg) and a tensile modulus of 900 MPa (23° C.) |
| Thickness of the PE top layer | mm | 3 | 3 |
| Extrusion temperature of the PE top layer | °C. | about 230 | about 230 |
| Silane cross-linkable HDPE | | HDPE with a density of 0.952 g/cm$^3$, a melt flow rate of 6.5 g/10 min (190° C./2.16 kg) and a tensile modulus of 1000 MPa (23° C.); grafted with 1.8 weight. - % vinyl trimethoxy silane | — |
| Thickness of the outmost silane cross-linkable PE layer (PEXb) | mm | about 1 | — |
| Extrusion temperature of the PEXb layer | °C. | 240 | — |
| Line speed | m/min | 2 | 2 |
| Pipeline temperature before the beginning of the cooling | °C. | 190 | 195 |
| Surface temperature of the coating | °C. | about 240 | about 235 |
| Temperature cooling water | °C. | 25° C. | 25° C. |
| Surface temperature of the coating after cooling | °C. | 60 | about 30 |
| Pipeline temperature after cooling | °C. | 60 to 80 | about 40 |
| Remainder time of the pipeline in the cooling step | min | 16 | 16 |

TABLE 2 properties of the coating

| Properties | Unit | Example 1 | Comparative Example |
|---|---|---|---|
| Thermal elongation (hot set) | % | 83 | not determinable |
| Gel contents | % | 64 | not determinable |
| Swelling value | % | 9.2 | not determinable |
| ESCR ($F_0$-value) | h | >6000 | 3000 |
| ESCR (FNCT at 4.0 MPa; 80° C.) | h | >1000 | 60 |
| Elongation in the time-tension experiment at 23° C./96 h | % | 0.6 | 1.96 |
| Impact resistance at −100° C. | $kJ/m^2$ | no break | break |
| Notch impact resistance at −40° C. | $kJ/m^2$ | no break | 4.3 |
| Tear strength at 23° C. | MPa | 16.5 | 15.5 |
| Breaking elongation at −45° C. | % | 250 | 130 |

Comment: the properties of example 1, if not indicated otherwise, relate to the PEX layer.

In the following section the methods of measurements used here will be described.

1. Thermal Elongation (Hot Set)

The thermal elongation (hot set) of the coating was determined in analogy to the norm DIN VDE 0472 T 615: a sample body in form of a rectangle (100×10 mm) was taken from the cross-linked layer, suspended hanging freely in an oven at 200° C. and subjected to a force of 20 N/cm². After 15 min the stretching of the sample body is measured. The thermal elongation is the change in length of the sample body in %.

2. Degree of Cross-Linking

The degree of cross-linking of the coating was determined in analogy to the norm ISO 10147 as follows: a sample body in the form of a rectangle (20×5 mm) was taken from the cross-linked layer, weighed with a precision of 1 mg and placed into a container of wire mesh. The container containing the sample was placed into a 2 litre gas flask with a reflux cooler. About 500 ml of technically pure xylene were added to the glass flask and brought to boil. After 8 hours of refluxing the container was removed from the glass flask. The sample is carefully taken out of the container and dried in a vacuum drying oven for at least 3 hours at 150° C. After cooling to room temperature the weight of the sample is determined with a precision of 1 mg. The degree of cross-linking G is the residual weight of the sample referenced to the previously determined total weight in %.

3. Swelling Value

A rectangular sample (20×5 mm) was taken from the cross-linked layer, weighed with a precision of 1 mg and placed into a test tube. This is filled to about ⅓ of its capacity with technically pure xylene and sealed with a cork stopper. The test tube is brought to a temperature of 140° C. for 2 hours with the help of a thermostat. After that the contents of the test tube is poured over a finely woven wire mesh (mesh density 400/cm²), the swollen sample is carefully removed from the wire mesh, placed upon a Petri dish and weighed. The swelling value is calculated from the weight of the swollen sample in relation to the weight of the non-swollen sample.

4. Stress Crack Resistance ESCR According to ASTM D 1693

The stress crack resistance of the cross-linked layer was determined according to ASTM D 1693. The value given is the $F_0$-value which gives the testing time up to which no failure of the sample bodies has been observed.

5. Stress Crack Resistance ESCR (FNCT)

The stress crack resistance (FNCT) of the cross-linked layer was determined according to an internal measurement protocol and given in hours. This laboratory method has been published by M. Fleißner in the journal Kunststoffe 77 (1987), pages 45 and following, and corresponds to the in the meantime applicable norm ISO/CD 16770. A shortening of the time until failure is obtained by the shortening of the time for the initiation of the crack by the notch (1.6 mm/razor blade) in Arkopal as a medium to propagate stress cracks at a temperature of 80° C. and a tensile strength of 4 MPa. The samples are obtained by taking three sample bodies with the dimensions 10×10×90 mm from the cross-linked layer. The sample bodies are notched with a razor blade in a specially prepared notching apparatus (see picture 5 in the publication). The depth of the notch is 1.6 mm.

6. Elongation in the Time-Tension Experiment

The elongation in the time-tension experiment was determined at a tension of 5 MPa at 23° C. after 96 hours according to the provisions set out in the norm DIN EN ISO 899.

7. Impact Resistance at −100° C.

The impact resistance was determined according to the norm ISO 180/U at −100° C.

8. Notch Impact Resistance at −40° C.

The notch impact resistance was determined according to the norm ISO 179-1/1eA/DIN 53453 at −40° C. For this a sample body with the dimensions 10×4×80 mm was prepared from the PEXb layer, wherein a V-shaped notch with an angle of 45°, a depth of 2 mm and a notch bottom radius of 0.25 mm was cut.

9. Tear Strength at 23° C.

The tear strength was determined according to the norm ISO 527 part 2 on a sample body type 1A with a thickness of 1 mm at 23° C. The samples were pulled with a speed of 50 mm/min.

10. Breaking Elongation at −45° C.

The breaking elongation was determined according to the norm ISO 527 part 2 on a sample body type 1A with a thickness of 1 mm at −45° C. The samples were pulled with a speed of 10 mm/min.

11. Melt Flow Rate 190° C./2.16 kg

The melt flow rate 190° C./2.16 kg of the used polymers was determined according to the norm ISO 1133.

12. Tensile Modulus

The tensile modulus of the used polymers was determined according to the norm ISO 527 part 2 on a sample body 1A, thickness 1 mm.

The invention claimed is:

1. A process for coating the exterior surfaces of pipelines with a polymer that is cross-linkable under exposure to water, comprising the steps:
    a) coating the exterior surface of the pipeline with at least one polymer that is cross-linkable under exposure to water, wherein the employed cross-linkable polymer comprises alkoxy silane grafted HDPE;
    b) cross-linking of the cross-linkable polymer by exposure to water at elevated temperatures, thereby forming a cross-linked polymer layer, until a degree of cross-linking of ≧30% to ≦80% is reached,
        wherein the layer of cross-linked polymer is the most exterior top pipeline coating, and
        wherein the process comprises the following steps:
        heating the pipeline to ≧170° C. to ≦230° C.;
        application of an epoxy resin by an electrostatic powder spray process with a layer thickness of ≧0.08 mm to ≦0.16 mm;
        application of an adhesive agent by a wrapper extrusion process with a layer thickness of ≧0.15 mm to ≦0.30 mm;

application of an HDPE layer by extrusion with a layer thickness of ≧2.8 mm to ≦3.2 mm;

application of silane cross-linkable HDPE layer by extrusion with a layer of thickness of ≧0.8 mm to ≦1.2 mm;

treating of the pipeline with water.

2. The process of claim 1, wherein the silicon content of the cross-linked polymer layer is from ≧0.10 weight-% to ≦1.00 weight-%.

3. The process of claim 1, wherein the time for the step of the reaction with water for the cross-linking of the polymer layer is from ≧0.5 min to ≦5.0 min per meter of the pipeline moving in longitudinal direction.

4. The process of claim 1, wherein the cross-linking of the polymer that is cross-linkable under exposure to water takes place at a temperature of ≧50° C. to ≦350° C.

5. The process of claim 1, wherein the breaking elongation of the coating, measured at −45° C., is from ≧135% to ≦400%.

6. The process of claim 1, wherein in the environmental stress crack resistance (ESCR) test (FNCT at 4.0 MPa, 80° C.) the coating remains stable over a time period of ≧100 hours to ≦10000 hours.

7. The process of claim 1, wherein the exterior surface of the pipeline is coated with at least two different layers.

* * * * *